Oct. 31, 1944.　　　　W. J. PETER　　　　2,361,494
FUEL HANDLING PIT BOX
Filed April 20, 1942　　　　8 Sheets-Sheet 4

INVENTOR
WILLIAM J. PETER
BY James C. Ledbetter
ATTORNEY

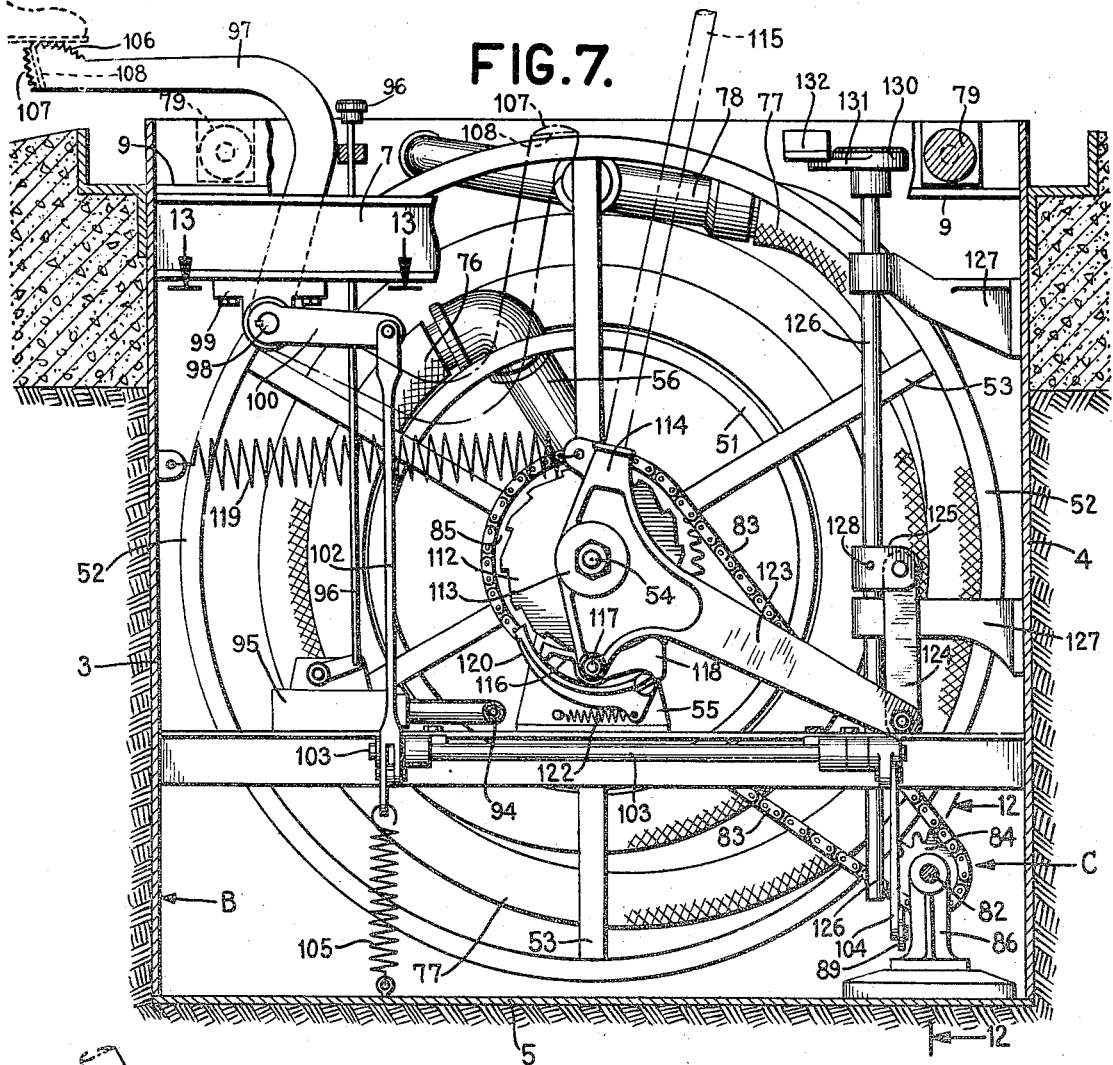
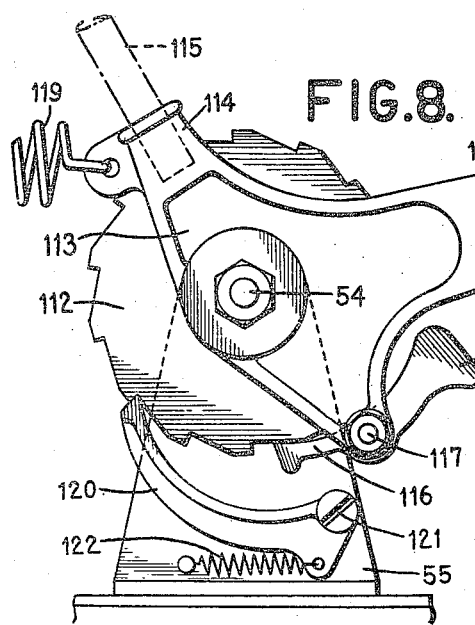
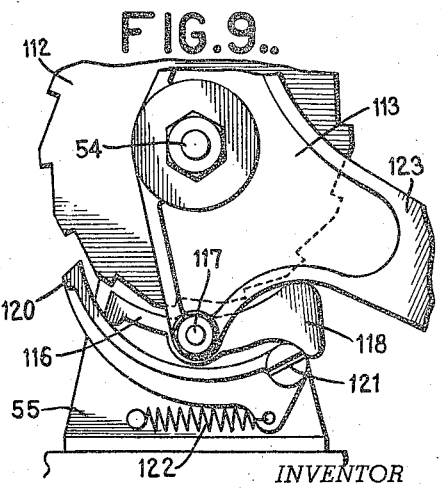

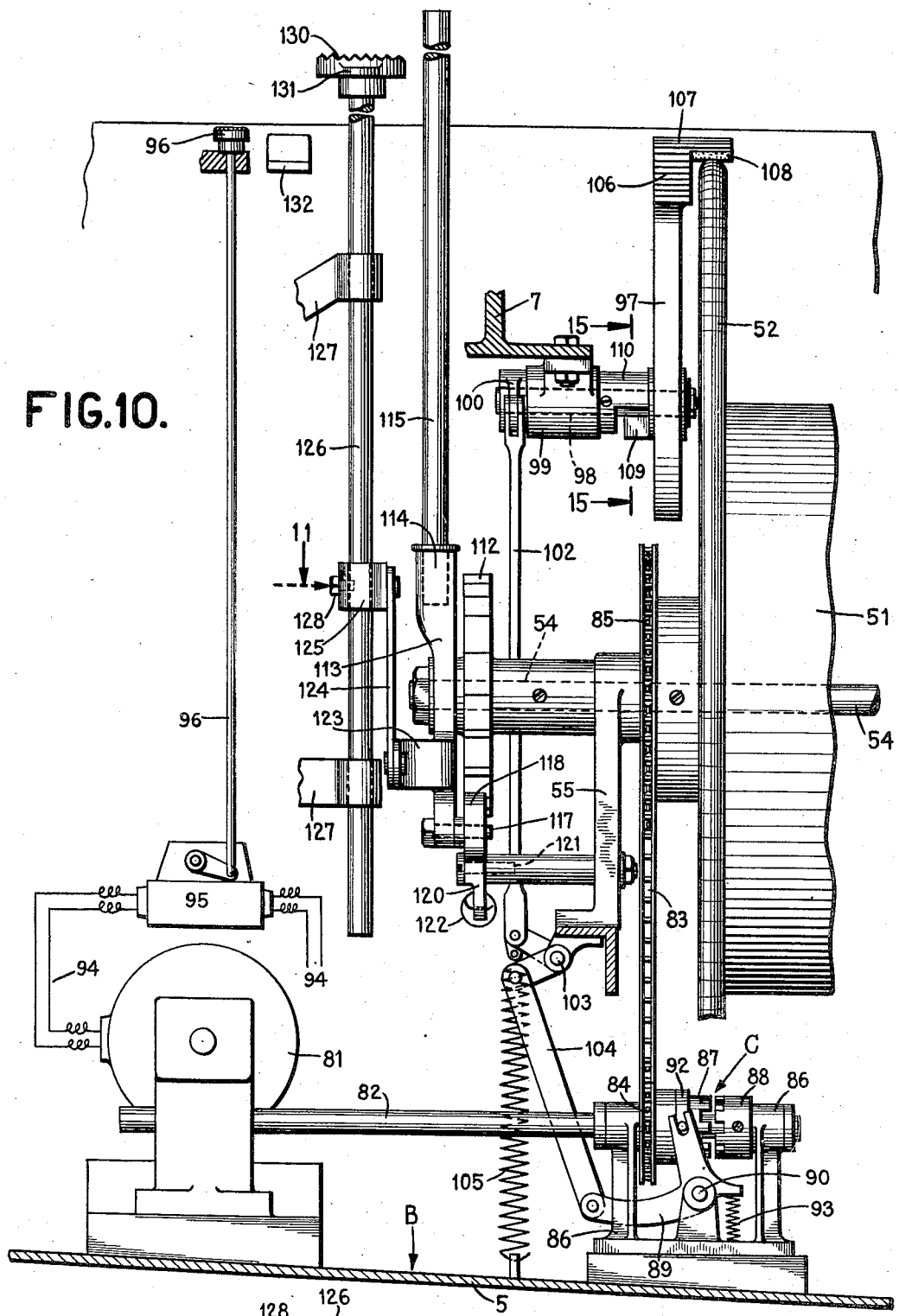

Oct. 31, 1944.　　　　　W. J. PETER　　　　　2,361,494
FUEL HANDLING PIT BOX
Filed April 20, 1942　　　　8 Sheets-Sheet 7

INVENTOR
WILLIAM J. PETER
BY
James C. Ledbetter
ATTORNEY

Oct. 31, 1944.  W. J. PETER  2,361,494
FUEL HANDLING PIT BOX
Filed April 20, 1942   8 Sheets-Sheet 8

INVENTOR
WILLIAM J. PETER
BY James C. Ledbetter
ATTORNEY

Patented Oct. 31, 1944

2,361,494

UNITED STATES PATENT OFFICE 2,361,494

FUEL HANDLING PIT BOX

William J. Peter, New York, N. Y., assignor to Aqua Systems Incorporated, New York, N. Y., a corporation of New York Application April 20, 1942, Serial No. 439,653

40 Claims. (Cl. 242—86)

This invention relates to oil and gasoline fueling systems for servicing automotive vehicles and more particularly to a fuel handling pit box for use particularly at airports for filling the fuel tanks of airplanes and also for removing the fuel therefrom.

An object of the invention is to produce fuel dispensing and defueling apparatus, including hose equipment with coiling and rewinding apparatus for plural hose lines of considerable length as well as other features, of such character and form as to adopt the apparatus for underground installations, say in a pit box submerged level or buried flush with the ground surface in order that automobiles, trucks, airplanes and the like may readily pass or run over the pit box to facilitate the movement of traffic in and around an airport.

Another object is to produce a compact and dependable plural hose equipment for pit boxes, one hose being adapted as a fueling dispenser to fill airplane tanks with gasoline, while another hose may be used when necessary for defueling a plane, that is, withdrawing the gasoline preliminary to storing the plane or putting it in the hangar for servicing operations where it would be undesirable to leave fuel in the plane tanks.

A further object is to provide motor means, such as an electric motor for driving a reel on which the hose line is stored, accessible for quick service in handling engine fuel, particularly for filling airplane tanks, together with a clutch pedal and electrical control mechanism for operating the motor in order to rewind the long hose after fueling the tanks, all for the purpose of rendering the apparatus safe, convenient and efficient for use in connection with pit box installations at airports and the like.

Another object is to provide hand and foot operating means, for joint or separate use, to drive or operate a pit box dispensing and/or defueling hose reel for rewinding the long fuel hose by an operator or operators in the event the electric current or other power medium may be off or the motor means is otherwise not functioning.

Likewise, it is an object to provide a multi-use pedal means concealed within the pit box when closed but movable outwardly therefrom when the box is open for safe and convenient use in controlling on the one hand the motor driven hose reel by engaging its clutch, as well as other features in combination with the same pedal which also is used on the other hand not only for positively disengaging the clutch but likewise as a braking means to hold the reel in check when rewinding the hose by foot or hand power in the event the motor means, say an electric motor, is not functioning.

Also, an object is to produce a pit box fuel oil handling apparatus having ground-flush lid or cover means of adequate strength and weight to support heavy vehicles, such as large passenger and bombing planes, which may taxi or travel across the pit box, together with counterbalancing means acting on the heavy lid in aid of raising and lowering it, and means for securely holding the lid in its visibly open position, as well as causing the lid to either act as a brake, or to act on the pedal as a brake, for braking engagement with the reel to hold it against turning when the lid is closed.

It is a further object to produce a simple underground pit box defueling apparatus, with long hose means for withdrawing fuel oil from a plane, comprising a simple basket-like receptacle into which the hose may be coiled by hand, together with metering and air eliminating means for the gasoline, as well as an electrical and valve control means to stop and start the defueling operation, and a safety lid means to cover the defueling apparatus in the pit box.

Having the foregoing and other objects in view, the accompanying drawings illustrate the principles of the invention, as regards its several features, and show examples or embodiments thereof for practical use, wherein:

Figure 1 is a top view of a pit box in which, centrally and including the right hand end compartment thereof, is located a dispensing hose on a reel with its meter and other parts. This view also shows, in the left hand end of the box, a defueling hose coiled into a retainer basket, together with its meter and accessory parts, and the transmission for operating the dispensing hose reel in the central compartment, aforesaid. The lid means is shown raised to open position, there being three lids covering the pit box shown in the present example of the invention, thus tending to form the box into three compartments.

Figure 2 is a lengthwise sectional side view made on the line 2—2 of Figure 1 showing the dispensing hose on the reel in partial section but omitting for clarity the defueling hose basket and hose from the left-hand compartment. One lid is closed over the dispensing meter compartment, although shown open in dotted lines, and the other two lids are open over the dispensing hose reel and the defueler hose compartments. As a matter of fact, raising the left hand lid alone gives access to the defueling apparatus, while the center lid and right hand lid are both opened when preparing to dispense gasoline.

Figure 3 is an enlarged end view made on the line 3—3 of Figure 2 showing the interior of the defueling compartment, including the hose coiled into its storage basket. The lid is in open position with its hold-open linkage of Figure 5 and counterbalance unit of Figure 6 fully extended. The motor means appearing in this defueling compartment is for operating the hose reel in the central compartment.

The hold-open linkage (Figure 5) and the counterbalancing means (Figure 6) are both used on each lid means, but are shown separately in the last two views for clarity.

Figure 2:
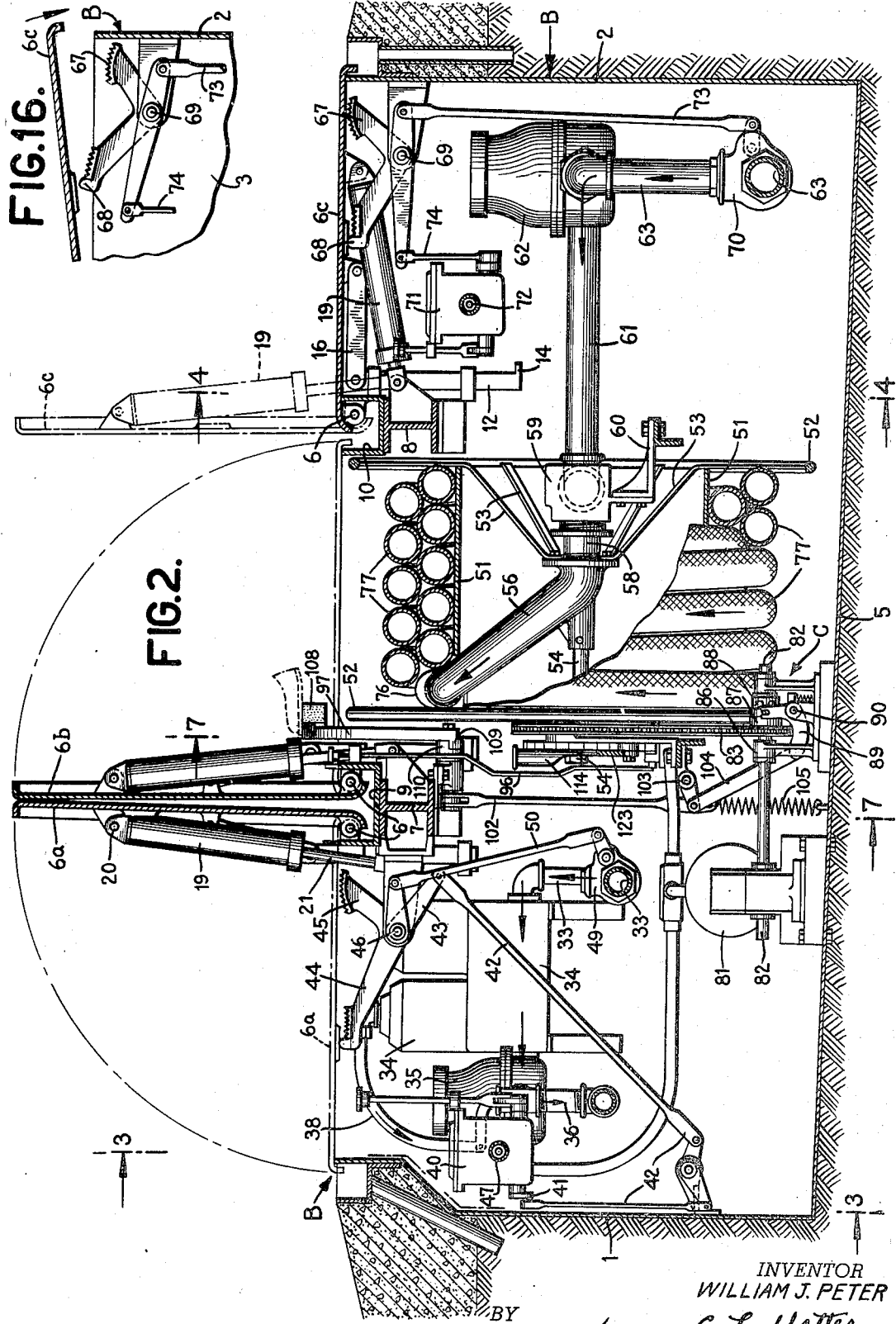

Figure 7 is a sectional view on the line 7—7 of Figure 2 showing an end view of the hose reel (adapted herein for the dispensing hose) with a motor driven transmission for rotating and controlling the reel to rapidly rewind the long hose after a dispensing operation has been completed. This view also shows the hand and pedal driving means for use also in rotating and controlling the reel in the event of emergency when the electric motor may not be in operating condition.

Figures 8 and 9 are two enlarged position views of the hand and pedal driving means for the hose reel, including a compound pawl and ratchet device by which to rewind the dispensing hose by hand and/or foot power.

Figure 10 is a diagrammatical side-view detail assembly of the hose reel with its optional driving means (motor, foot and/or hand power) as developed on a larger scale than shown in Figure 2 and with the parts somewhat separated for clarity.

Figure 11 is a section on the plane of line 11—— in Figure 10 showing one means by which a plunger pedal may be partially rotated or twisted by manually adjusting it for use in one instance and non-use in another instance.

Figure 12:
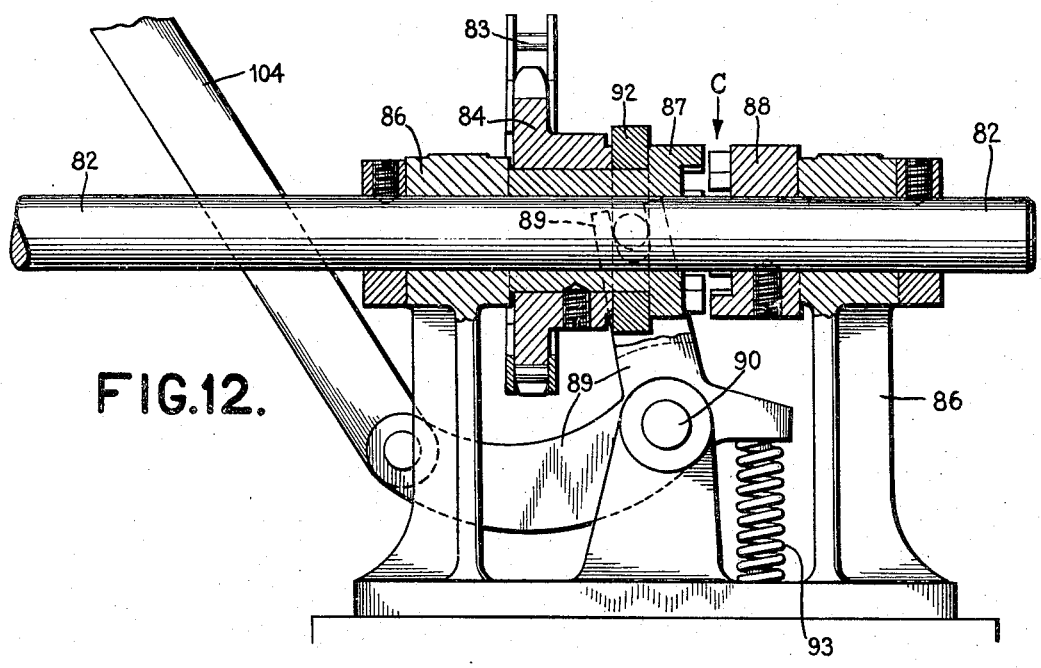

Figure 12 is a longitudinal side sectional view made along the motor driven shaft (see line 12—12 in Figure 7), constituting part of the motor transmission drive, through and including a clutch as well as sprocket and chain for rotating the reel to wind in the hose.

Figure 13:
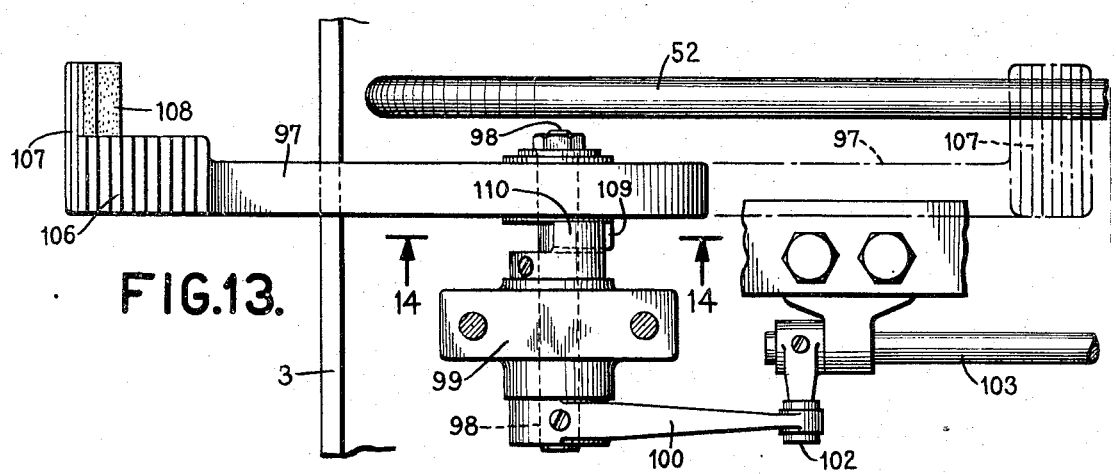

Figure 13 is a top view of a universal or multi-use pedal specially devised for engaging, in one instance, the clutch of the motor driven reel and, in another instance, for applying a brake to the reel. The latter position is shown in dotted lines. The pivot means on which this combination clutch and brake pedal is carried is located by the section line 13—13 of Figure 7.

Figure 14:
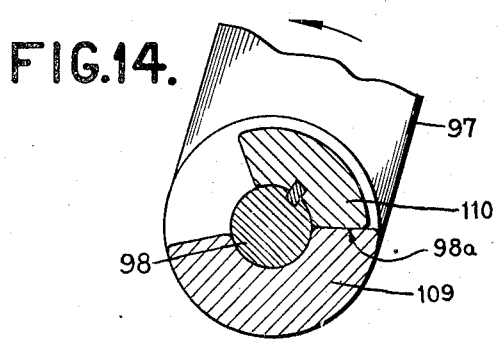

Figure 14 is a detail view on the line 14—14 of Figure 13 showing the pivot means feature of the foregoing universal pedal, including the shaft in section on which it is mounted, the position of the parts being that of clutch engagement for motor drive of the reel, the pedal being broken away.

Figure 15:
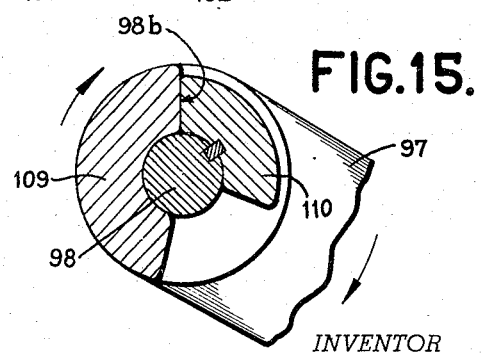

Figure 15 likewise may be regarded as a section on the line 14—14, but showing the clutch pedal swung into the pit box, as occurs either at the end of a motor rewinding hose operation, or during foot and hand rewinding hose operations to be performed in the event the electric motor is not working. As to the position of the parts in Figure 15, the view is taken on the line 15—15 of Figure 10.

Figure 16 (sheet 2) is a side detail of a two-arm switch-and-valve control pedal, one each of which is used in the defueler and in the dispenser compartments for actuating the respective control means which starts and stops the fuel flow.

Figure 17:
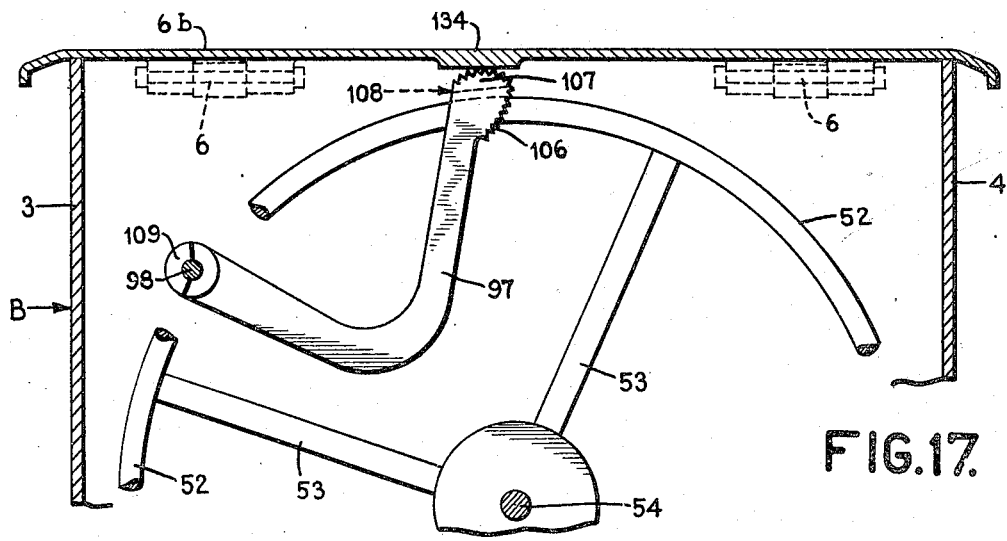
Figure 18:
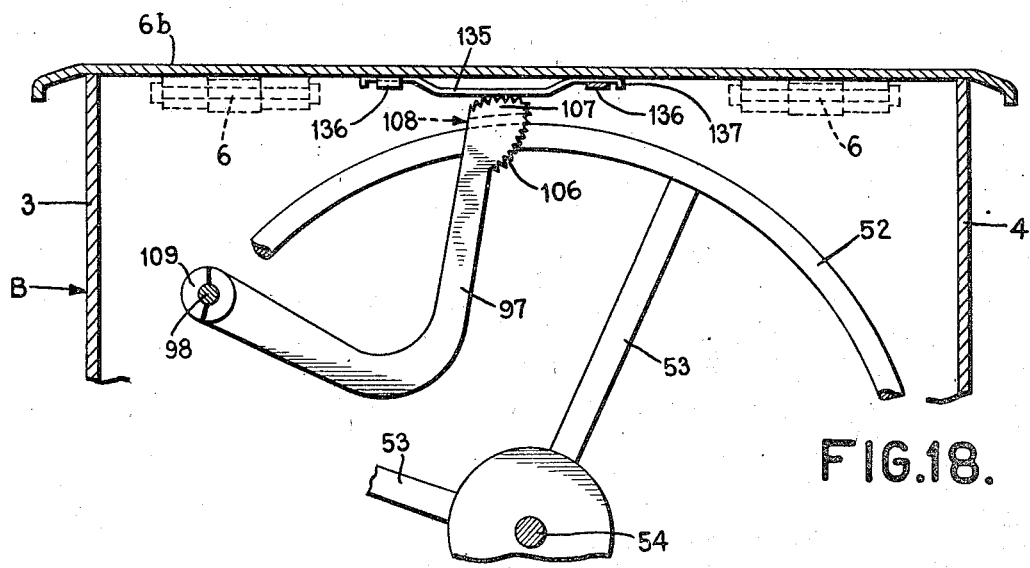
Figure 19:
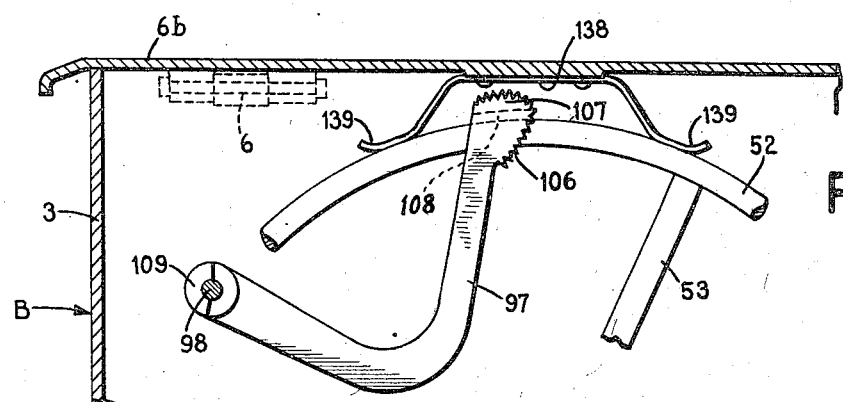

Figures 17, 18 and 19 are illustrations of another principle of the invention by which the pit box lid brakes the hose reel and holds it from turning when not in use to insure against loosening of the hose or snarling of same and to keep the hose nozzle at the top of the reel in easy reach.

Figure 17 shows the pit box lid engaging the inwardly retracted clutch control pedal and holding it against the reel.

Figure 18 shows the pit box lid performing the same function as in previous view, but employing a braking spring by which to permit the lid to more readily close onto the top edges of the pit box.

Figure 19 shows the pit box lid and its weight applied through a spring foot directly against the hose reel, without employing the clutch control pedal as a braking means.

*The pit box and lid construction*

Referring further to the drawings, the pit box or underground housing for the apparatus is indicated generally at B, and comprises end walls 1 and 2, side walls 3 and 4, and a bottom wall or floor 5. The open top of the box is provided, in this example of the invention, with one or more lid covers 6a, 6b and 6c. A hinge 6 pivotally attaches each lid to the box on an axis crosswise the length of the box. A pair of lids, say 6a and 6b, may have adjacent pivot mounts 6 and swing upwardly into open position toward each other, as shown in Figure 2.

Cross I-beams 7 and 8 provide a foundation or support for parts of the apparatus and the series of lids. Cross channel beams 9 and 10 may rest under the beams 7 and 8, and the lids with their hinges are mounted on these latter members. These cross beams tie together the side walls of the pit box B at the upper portion thereof, reinforce the box, and sustain the weight of vehicles which may travel across it. The large pit box B is fabricated of steel plate and beam construction and is welded into an integral unit.

Each lid is equipped with a gravity prop-up or hold-open unit or means (Figure 5) to hold the lid in a lean-back position under the influence of gravity, in combination with a counterbalancing means (Figure 6) which aids the raising and lowering of each lid.

Figure 5:
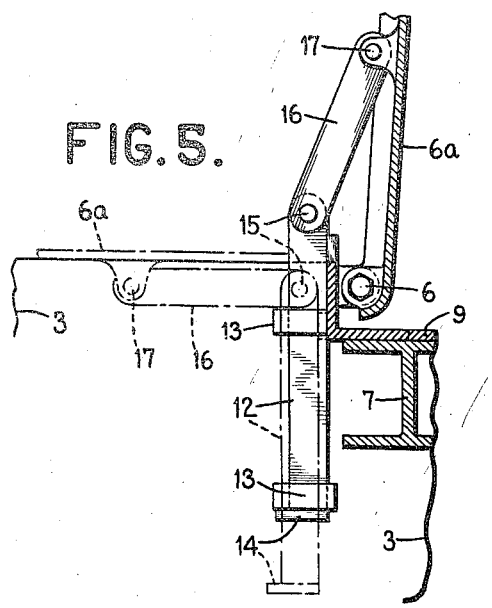
Figure 5 is a detail view on the line 5—5 of Figure 3 showing one of the pivoted lid means in upright, open and rearwardly leaning position on the pit box, with a linkage means to hold the heavy lid in this up position against the pull of gravity.

To first describe the hold-open linkage means, reference may start with Figure 5 as typical for all lids on the pit box. A vertical slide link 12 is confined in spaced guide loops 13 welded onto the inside of the box wall 3. A stop lug 14 is formed integral on the lower end of each link 12. The upper end of link 12 is pivotally connected at 15 with a swing link 16, of which the upper end also is pivotally connected at 17 to the lid 6a forwardly of its pivot or hinge 6. Figure 5 shows this hold-open linkage in dotted line position when the lid is closed, the slide link 12 having limited lateral freedom in the spaced guides 13 in order that pivot 15 may shift and adjust to the swing of the lid.

The prop-open linkage 12, 16 permits the lids 6a, etc., to stand open and lean rearwardly beyond the vertical plane of the hinge axis 6, and in this way gravity pulls laterally on link 16 and upwardly on the slide link 12, the latter holding its vertical position, with its lug 14 stopped against the lower stationary guide 13 to limit the rearward tilt of the lid to the leaning and braced position shown. This arrangement safely holds a heavy lid in open upright position where it is visible to truck drivers and plane pilots as an indication that the pit box is open.

Figure 6:
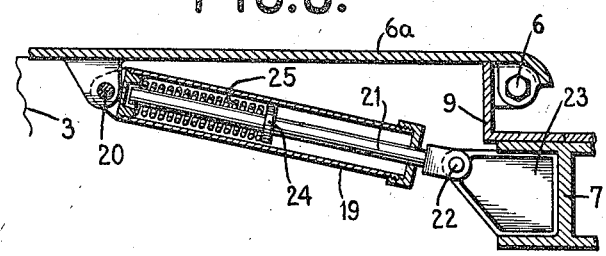
Figure 6 is a detail view of the lid closed with its counterbalancing means under compression or spring-loaded to aid the manual raising and lowering thereof to open and close the pit box. Note line 6—6 of Figures 3 and 4.

Next, a description is given of the counterbalancing unit for each lid, and reference may start with Figure 6. A tube or cylinder 19 for each lid has its outer closed or headed end pivotally connected at 20 to the underneath surface of the lid 6a and others at a point toward the front free edge thereof, and a plunger rod 21 has its rear end pivotally connected at 22 on a bracket 23 welded into the cross beam 7 just below the hinge pivot 6. The plunger 21 reciprocates within the tube 19, and a shoulder 24 forms a part of the plunger. A compression spring 25 in the forward end of the tube 19 is confined on the outer free end of the plunger between its shoulder 24 and the outer head end of the tube 19.

Accordingly, the spring 25 is subjected to compression by the movable tube between its pivoted outer end 20 and the plunger shoulder 24. When the lid is fully open and leaning rearwardly, the compression spring 25 is free (see Figure 3) but after the lid moves downwardly a few degrees the spring 25 begins to compress and take up the heavy load of the lid and increasingly resists its downward movement under the pull of gravity. The swing of the lid in its upper range of movement is not acted on by gravity to an appreciable extent because the hinge 6 then carries most of the weight; hence the spring 25 may be made shorter than the tube 19 so that the spring compresses during the lower range of lid movement where gravity exerts a maximum pull.

A large lid cover for a pit box fueling system contemplated herein may weight upwardly of 150 pounds more or less in order to safely support heavy vehicles, and the compression spring 25 carries a portion of this dead weight, say about one-third thereof more or less, in order that an operator in raising and lowering the lid may only handle about two-thirds or say one-half of the lid weight.

The combination of the prop-up linkage unit 12, 16 with the counterbalancing unit 19, 25 provides a sturdy mechanism for handling each lid cover 6a, 6b and 6c for the pit box dispenser and defueler. This type of lid linkage is compact and hugs the side wall of the box thus taking up a minimum of space.

A pit box fuel handling apparatus of this character is installed or submerged in the ground with a concrete apron or emplacement surrounding same. A drain gutter is necessarily welded to the upper outer marginal edges of the pit box and the concrete apron brought up flush with the gutter. The outer down-turned edges of the lids overhang into the gutter. In this way, the upper rim or edge of the pit box is at ground level. The box is comparatively water tight and the apparatus inside thereof is protected from the weather. Provision, of course, is generally made at airports for occasionally pumping out any accumulation of water from the pit box installations.

The defueling apparatus

Figure 1:
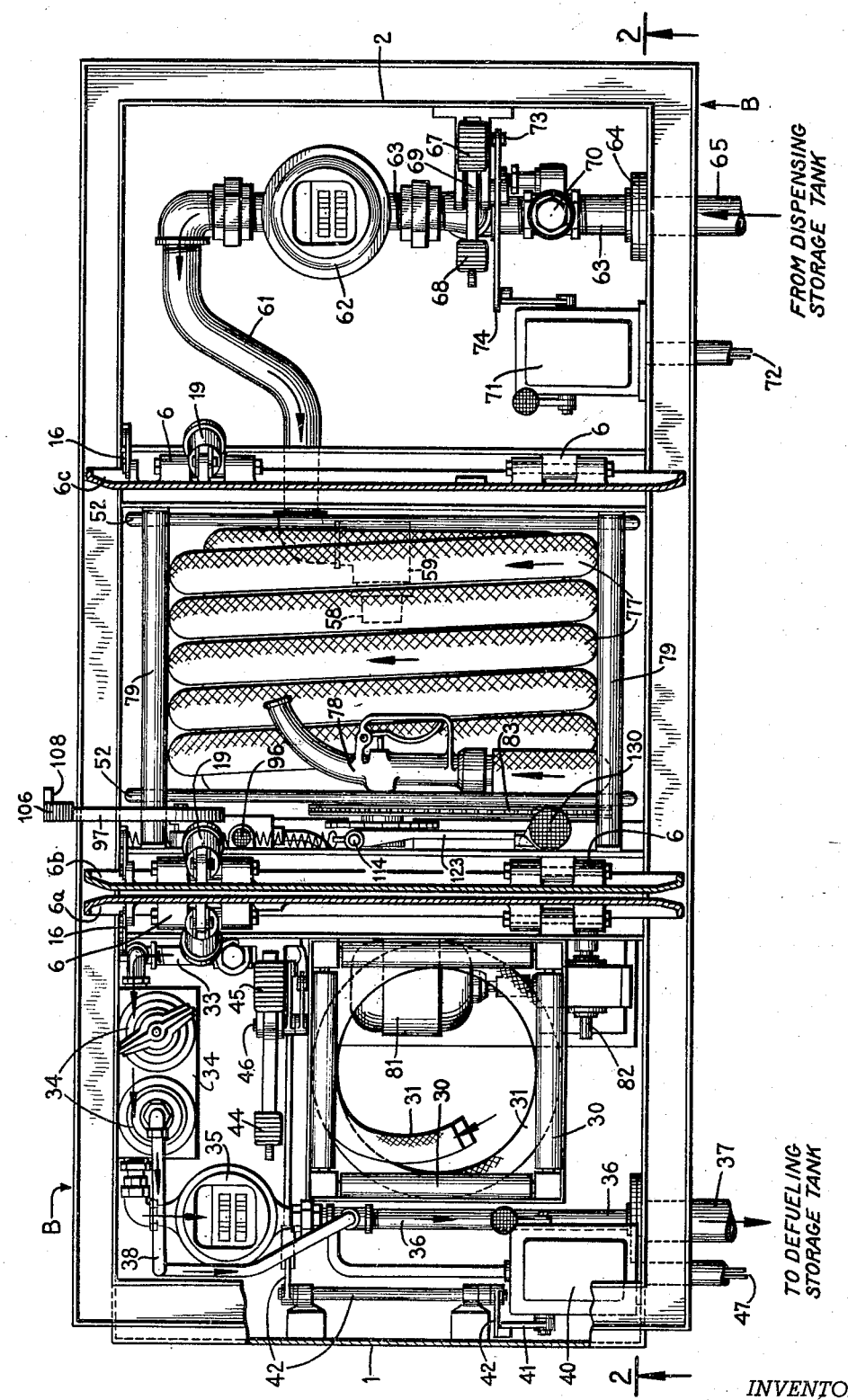
Figure 3:
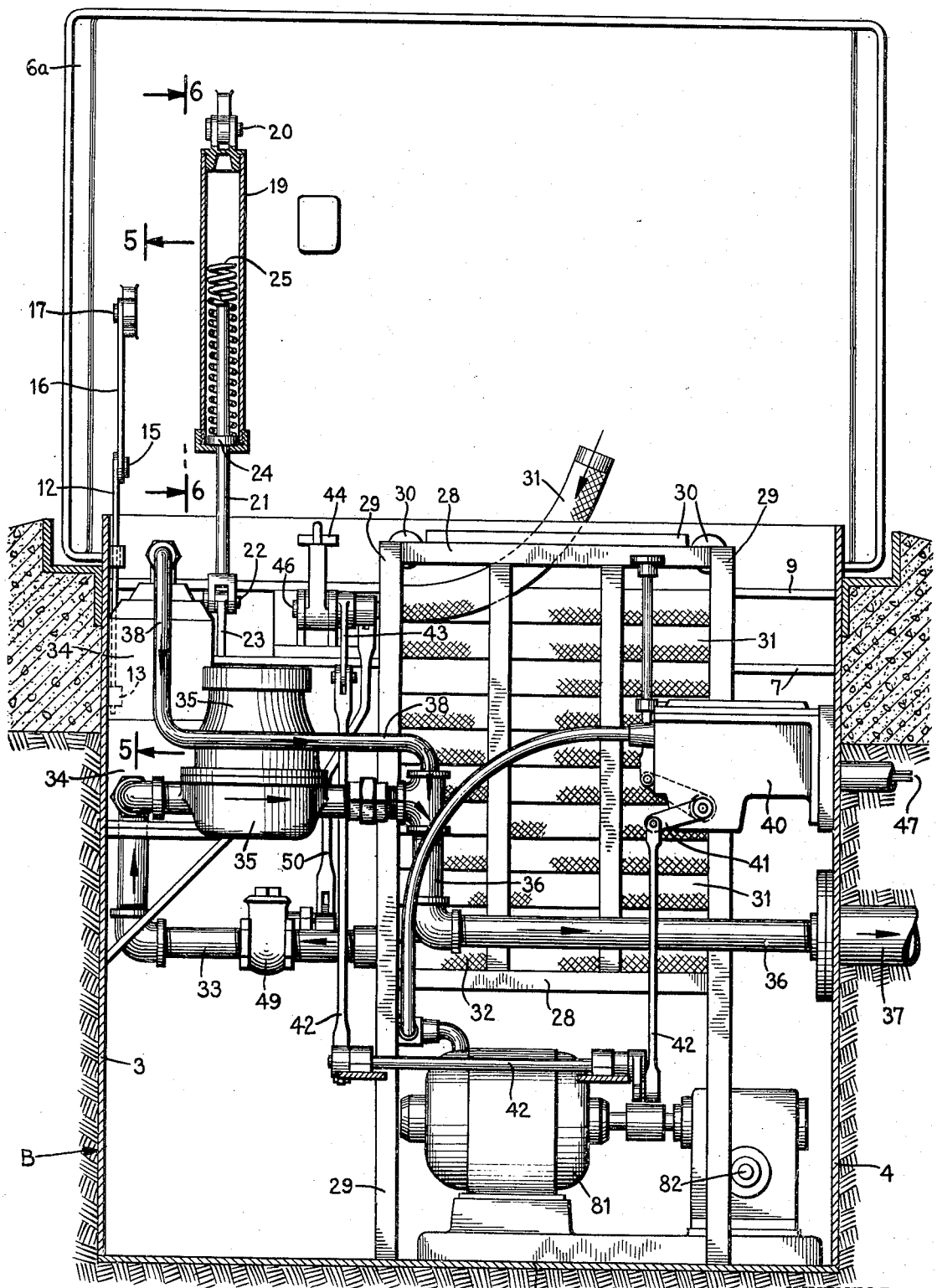
Figure 4:
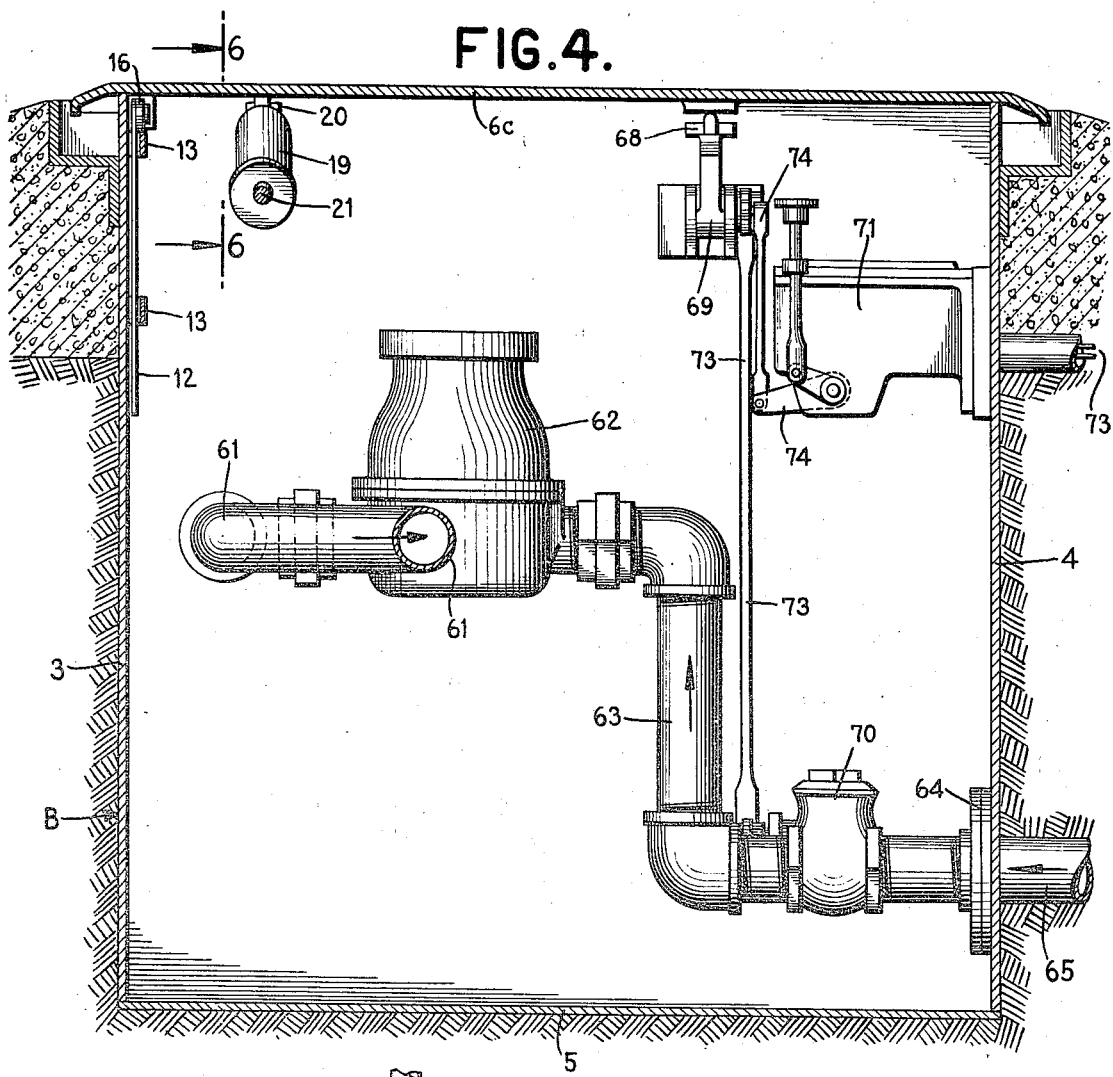
Figure 4 is a vertical cross-section on the line 4—4 of Figure 2 looking into the dispensing meter compartment with its lid closed down on the pit box.

The long hose and accessory equipment for withdrawing gasoline from airplane tanks is shown in Figures 1, 2 and 3 at the left-hand end of the pit box B submerged to ground level. A hose receptacle comprising an open frame-like basket 28 is carried on legs 29. The bottom of the basket 28 may be supported above the floor 5 of the pit box by the legs.

In this instance, the basket is of square formation and has four rollers 30 at the inner top portion over which runs the hose in pulling it out and coiling it back into the basket. The upper edge and rollers 30 of the hose basket 28 are disposed near the upper edge of the pit box B at ground level in order that the hose next described may be handled at ground level.

A long defueling hose line 31 has its lower coiled end 32 connected through the bottom of the basket with a defueling pipe 33 which leads the gasoline through a combination strainer and air eliminator 34, and thence through a meter 35 to measure the gasoline withdrawn through the defueling hose 31. The gasoline then flows into a pipe 36 which connects through the pit box B with a large pipe line 37 serving to convey the gasoline withdrawn from the tanks of an airplane to a storage tank not shown. The direction arrows on the hose and piping show the direction of defueling flow of the gasoline.

An air pipe 38 has one end connected with the upper end of the air eliminator 34 and its other end connected into the defueling pipe 36 beyond the meter 35 in order that air and gas vapor separated from the gasoline in the strainer and air separator unit 34 may be returned to storage through the pipe 36, instead of being vented to the air and at the same time not pass through the meter 35.

An electric motor driven suction pump unit (not shown) is connected with the defueling pipe line 36, 37 at some convenient point remote from the pit box B, and a switch control for same is shown at 40 in the form of a switch box. Any suitable switch or electrical control is housed within the switch box 40 and is operated by an arm 41 pivotally connected through linkwork 42 with an arm 43 of a two-arm pedal 44, 45 pivotally mounted in the pit box B at 46 near the ground level and within reach of an operator's foot.

One arm 44 of the pedal is positively engaged by the lid 6a to tilt said pedal counterclockwise (Figure 2) when the lid is closed downwardly in order to positively operate the switch arm 41 through the linkwork 42 and hence open the switch in the box 40. This breaks the circuit of electrical wiring 47 leading from the switch box 40 to the previously mentioned electric motor driven defueling pump (not shown) used in connection with sucking gasoline through the defueling hose 31 and back through the meter 35 and hence to the defueling storage pipe line 36, 37 leading to a storage tank, not shown.

A defueling shut-off valve 49 is included in the defueling pipe line 33 and operated by additional linkwork 50 operatively connecting said valve with the pedal 44, 45. Thus when the pedal 44 is pushed down by the operator's foot, or by the pit box lid 6a, the valve 49 is positively closed.

In the use and operation of the defueling apparatus (Figures 1, 2 and 3) the lid 6a is raised and the control pedal 44 is now free of the lid 6a. The upper free and open end of the hose 31 is uncoiled (see its end being started over roller 30) and withdrawn from the pit box basket 28 and inserted into a gasoline tank to be defueled. The operator then depresses the starting pedal 45 which actuates the linkwork 42 to close the switch in the electrical control box 40 and simultaneously opens the defueling valve 49. The defueling pump unit (not shown) at the end of the circuit 47 and storage pipe line 37 now start their operation and suck the gasoline from the plane tank through the hose. The direction arrows indicate the defueling flow.

Depressing the starting pedal 45 for defueling also tilts the safety pedal 44 upwardly beyond the plane or line of the lid 6a in order that when said lid is lowered again the safety pedal 44 will be engaged and tilted counterclockwise to positively open the switch in box 40 and break the current in the circuit 47 controlling the remotely located defueling pump motor. Likewise, the heavy lid 6a acting downwardly on the pedal 44 again closes the defueling valve 49.

The foregoing apparatus is simple and positive in use for defueling gasoline tanks and is conveniently mounted in the same pit box B with the dispensing apparatus next described for fueling the tanks.

*Hose reel dispensing apparatus*

A description will now be given of a hose reel and accessory dispensing means in the pit box B. This feature of the invention is shown in Figures 1, 2, 4 and 7 through 15 relating to the dispensing control and electric motor driven transmission for reverse rotation of the reel to rewind the hose thereon, as well as alternate or optional operator-actuated means in the form of hand lever and pedal means also used for driving the reel when the power transmission of the motor may not be in operation.

A hose reel is formed of a cylindrical body or hose receiving drum 51, with side flange or rim means 52 at each end thereof, and in between which the wound hose is confined. The two spaced rims 52 at each end of the drum 51 are shown attached to the reel drum 51 by spokes 53. A shaft 54 has one end journaled for free rotation in a bearing bracket 55, and this shaft end projects through the bearing bracket for use in connection with hand and foot operated parts later described for manual use by an operator. The shaft 54 has its other end fixed or pinned in a hub axially within the reel drum 51 and integrally made with a gasoline conduit elbow 56 which revolves with the hose reel.

The spokes 53 for the right-hand end of the hose reel (Figure 2) are directed axially into the reel drum 51 and are bolted or welded to a flange formed on the axial portion of the rotating elbow 56. A nipple 58 screws into the rotatable flanged elbow 56, forming a part thereof, and rotates with it and the hose reel. The inner smooth end of this nipple 58 constitutes a bearing which passes through an ordinary stuffingbox nut and rotates within a suitable packing gland in a stationary stuffing box 59 fixed on a frame bracket 60 (Figure 2) forming part of the inside bracing of the pit box B.

A gasoline delivery pipe 61 has one end connected with the stationary stuffing box 59 and its other end connected with the outlet side of a meter 62 for measuring the gasoline delivered through the stationary leak-proof stuffing box 59 to the rotatable elbow 56 of the reel and dispensing hose. The inlet side of the meter 62 connects with a pipe 63 which leads to the wall of the pit box (Figure 4) where it is screw fastened thereto by a flange connection 64.

After the pit box B is installed in the ground, a gasoline delivery pipe 65 outside the box is brought through the ground from a storage tank (not shown) and permanently screw connected at 64 with the pit box dispensing piping 63 leading through the meter 62 to the hose reel means.

A dispensing control two-arm pedal 67, 68 is pivoted at 69 in the pit box with the tread of each pedal close to the upper edge of the box and the ground level. A dispensing-off-and-on valve 70 is provided in the delivery inlet pipe 63 ahead of the meter 62, and switch mechanism in an electrical box 71 controls a power circuit 72 leading to an electrically operated dispensing means (not shown) which may be either a pump or hydraulic fuel propelling unit. Linkwork 73 interconnects the dispensing control pedal with the valve 70, and linkwork 74 interconnects the switch mechanism 71 with the pedal.

Depressing the pedal 67 opens the valve 70 and hence the delivery pipe 61, 63 leading to the dispensing reel and simultaneously closes the switch mechanism 71 to energize the power circuit 72 for starting the dispensing flow of gas through the pipe line 65 leading from a storage tank (not shown) to the pit box piping 63. This dispensing control pedal 67, 68 may be a duplicate of the defueling control pedal 44, 45 heretofore explained. It is seen (Figure 16) that the safety pedal 68 is pushed up above the plane of the box lid 6c, and above the ground-flush edge of the pit box B, when the starting pedal 67 is depressed. Consequently, the manual closing of the lid acts to tilt the safety pedal 68 back down into the pit box, thereby opening the power circuit 72 (Figure 2) for shutting off the dispensing flow from a storage tank, and at the same time the dispensing line 63 is positively closed by the valve 70.

Coming back to the conduit elbow 56 carried within the reel drum 51 and rotatable therewith, it will be noted that the inner end or coil 76 of a long dispensing hose line 77 is joined to the outer end of this conduit where it passes through the drum. This hose 77 in some installations is 100 to 150 feet long, more or less, in order to quickly reach the tanks of large planes, without taxiing them unduly close to a dispensing station pit box, or to reach the far side wing tank of a big plane. The outer free end of the dispensing hose 77 is fitted with a valve-closing dispensing nozzle 78. When ready to dispense fuel, the center pit box lid 6b is raised, and the hose is unwound by pulling out the nozzle 78. The hose is protected by running over rollers 79 located at the upper edge of each side wall of the pit box.

In the foregoing, the gasoline dispensing and features accessory thereto have been described, and now follows an explanation of the reel rewinding apparatus and its transmission wherein, preferably, motor means is used but likewise there is provided operator-actuated driving means for emergency use.

The motor drive for the reel

An electric motor 81 drives through a shaft 82 to a clutch C of known type (Figures 2, 7, 10 and 12), and thence through a transmission including a chain drive 83 or other means, to rotate the reel 52 in a clockwise direction (Figure 7) for rewinding the long dispensing hose 77 thereon. The motor 81 with its drive shaft 82 and gear reduction unit of known type, is shown here as installed on the pit box floor in the defueling compartment (left end of pit box B) where there is space for these parts used in connection with the reel dispensing unit in the center and right-hand end of the box. The chain 83 runs on a small driving sprocket wheel 84 driven by the shaft 82, and this chain reaches upwardly and around a large driven sprocket wheel 85 fixed on the reel shaft 54.

The low speed of the motor driven shaft 82 adapts this power transmission for use with a dog-type clutch C operable on the shaft 82 journaled in a bearing carried by a bracket 86. The driving sprocket 84 is free to stand still or idle on the motor driven shaft 82 and is also slidable axially thereon for clutching action. A toothed clutch sleeve 87 of the driving sprocket free on the shaft is shiftable into and out of engagement with a companion toothed sleeve 88 fixed on the shaft 82 by a set screw or other means making it permanent on the shaft to constantly rotate therewith when the motor 81 is running.

A clutch shifting fork 89, pivoted at 90 on the bearing bracket 86, is loosely connected with a clutch-shifting ring or collar 92 in a known way also free on the sprocket-clutch sleeve 87 for effecting clutching and declutching operation between the intermittently running free sprocket-clutch sleeve 87 and the constantly running fixed clutch sleeve 88. A spring 93 is under compression between the bracket 86 and the clutch shifting fork 89 urging the latter counterclockwise (Figure 12) by which to normally urge and hold the dog clutch C disengaged. Thus the motor and drive shaft 82 are first set in operation before engaging the clutch for rotating the hose reel 52.

A power circuit 94 (Figure 10) connects with the hose reel motor 81, and a switch box means 95 is included in this circuit for starting and stopping the electric motor. A switch button and its linkwork 96 operatively connects with a switch within the box in a known way to open and close the power circuit 94. This linkwork 94 enables an operator to start the motor 81 by pulling up on the button (note Figures 2 and 7) which, in order to start the motor, must be pulled upwardly above the plane or line of the pit box lid 6b. Thus if the operator does not push the switch-control button 94 back down to motor-off position (Figure 10), the lid 6c automatically does so when lowered to close the reel compartment of the pit box B.

The manual or operator's control of the clutch C in the electric motor transmission line is effected by a combination clutch and reel brake pedal 97 operatively mounted on a rock shaft 98 (Figures 7 and 10) journaled for free oscillation in a bearing 99 fixed on the lower face of the cross beam 7. Inasmuch as this clutch pedal 97 is located within the upper portion of the pit box near one side wall 3 thereof, while the clutch C is installed near the other side wall 4 and at the bottom, in the present form of commercial construction, a train of linkwork necessarily is provided as an operating connection between the pedal and clutch.

Accordingly, an arm 100 is keyed or otherwise anchored to the pedal pivot or rack shaft 98, with a link 102 operatively connecting said arm with a linkwork rock shaft 103 through a similar arm fixed on its left end, together with a like arm fixed on the right-hand end of said shaft 103, in order that a final link 104 may be operatively connected with the free end of the shifting fork 89 of the clutch C. A tension spring 105 pulls downwardly on the link 104 to normally maintain the clutch C disengaged and likewise the outer free end of the pedal 97 in its uppermost position. This is a conventional motion-transmitting linkwork from the pedal arm 100 to the clutch-shifting fork 89.

The operator depresses the outer free end of the pedal 97, thereby further tensioning the spring 105, and rocks the linkwork shaft 103 clockwise (Figures 2 and 10) to pull upwardly on link 104, thereby engaging the clutch C and starting the hose rewinding operation of the reel 52. The operator maintains foot pressure on the pedal 97 to hold the clutch C engaged, and upon removing this foot the spring 105 disengages the clutch and restores the outer end of the pedal 97 to its up and clutch-out position.

It will be noted that the clutch pedal 97 has a central bend of about 90° more or less and, together with other features, performs a number of independent functions. The mounting pivot 98 located in the pit box, as shown, below the ground level, enables the upper free end of the pedal, with a knurled tread 106 for foot control by an operator of the clutch C, to be tilted outwardly beyond the edge of the pit box into a position above the ground or concrete apron. In such position, an operator can conveniently depress the pedal end 106 for starting and stopping the motor driven reel 52. So long as the operator depresses the foot tread 106, the pedal grips the rock shaft 98 (as later explained) and pulls upwardly on the link 102 for the purpose of maintaining the clutch C engaged, against the pull of the spring 105 tending to disengage it, as heretofore explained.

However, the pedal 97 may be swung clockwise, over and back into the pit box below the lid line (Figures 10 and 13, also dotted-line position in Figure 7), not only to enable the lid 6b to be closed after each use of the apparatus, but more particularly in order that the pedal may rest against the reel 52 to control the latter when initially unwinding the long dispensing hose 77 by hand. One operator grasps the dispensing nozzle 78 and runs out with the hose 100 feet or so to a plane to be fueled, while another operator may apply light pressure on a second foot tread 107 to bear a brake pad lining 108 of the pedal against the reel rim 52. The operator applies light foot pressure on the pedal tread 107 so as to prevent the inertia or momentum of the rapidly rotating reel from running ahead of the hose-unwinding operation which otherwise would tend to snarl and kink the hose. The clutch-disengaging spring 105 holds the clutch C open when the pedal 97 is swung into the pit box; in fact this spring holds the clutch open at all times except when the pedal 97 is in its outermost position beyond the edge of the pit box and is being depressed by the operator's foot dotted in at Figures 2 and 7.

Initially, therefore, the multi-use pedal 97 acts as a brake on the reel 52 (Figure 10) when manually unwinding the hose preliminary to fueling a plane, and the pedal is thereafter tilted outwardly (Figures 1, 2, 7 and 13) for engaging the clutch C of the motor-driven transmission when rewinding the hose by the motor 81 after the fueling operation. Again, the second pedal tread 107 with its brake pad 108 is also used to control the rewind rotation and momentum of the reel 52 when turning it by hand or by foot (later described) for a hose rewinding operation. The angular relation of the dual purpose pedal treads 106 and 107, and the location of the brake pad 108, with a correct location of the pedal supporting rock-shaft pivot 98, provide a simple control pedal capable of several uses.

Now as to the two positions of the pedal 97 on its pivot shaft 98, by which its several functions are attained, it is seen (Figures 2, 10, 13, 14 and 15) that the pedal has an integral quadrant hub 109 free on the rock shaft 98, and that said shaft is likewise free in its bearing 99. A companion quadrant sleeve 110 is fixed on the shaft 98, pinned thereto by which it rocks the shaft and hence swings the fixed arm 100 of the linkwork from 102 through 104 to engage the clutch C. This quadrant sleeve 110 fixed on the rock shaft 98 and its companion pedal hub 109 free on said shaft have radial lugs which overlap into shouldering coaction (see Figure 2) by which the free pedal hub 109 abuts and forcibly oscillates the fixed hub 110 at 98a (Figure 14) and hence urges the rock shaft 98 counterclockwise (Figure 7) when the pedal 97 is positioned outside of and above the pit box in reach of an operator's foot (Figures 2 and 7) by which to depress the pedal tread 106 and thus engage the clutch C.

However, when this dual-purpose pedal 97 is tilted back into the pit box B to rest upon or close to the reel rim 52 (Figure 10, also dotted position Figures 7 and 13), it then follows that the quadrant hubs 109 and 110 become radially separated (Figure 15) from each other and function as lost-motion means, the pedal 97 now being free on its pivot shaft 98, and no coaction existing at 98a. The operator may now press his foot on the pedal tread 107 to either retard or permit increased speed of rotation of the hose reel, thus controlling and maintaining the long hose 77 in evenly coiled condition and avoiding injury thereto.

It is noted that the diameter of the reel rim 52 approaches the width and depth of the pit box B, and in particular that the high point of the rim is close to the line of the box lid, with clearance between the pedal end 107 and lid when said pedal is folded over into the box. Thus the pedal 97 is near the ground level and in convenient reach of the operator's foot in both adjusted positions of use. The axes of the reel 52 and pedal pivot 98 are parallel, the pivot being located below ground level and between the reel shaft 54 and pedal pivot. These relations afford the two pedal positions in question.

The foregoing covers the description of the structure and mode of operation of the motor drive transmission for the power operation of the reel when rewinding hose, and a description will now follow of the hand and foot apparatus for manually rotating the reel also for rewinding the hose in the event of an emergency and the electric motor 81 may not be in operation.

*The operator's hand and foot drive for the reel*

Optional hand and foot operating means are provided for driving the reel clockwise (Figure 7) to rewind the hose 77 in the event the motor 81 may not be in operation due to interruption of its power circuit. In this connection, an operator-actuated ratchet wheel 112 is fixed on the reel shaft 54 to turn it. A ratcheting dog 113 is free on the reel shaft adjacent the ratchet wheel.

A handle socket 114 is formed in the upper portion of the dog 113, and a removable handle 115 is mounted upright therein. When not in use, the handle may be kept in the pit box. The handle is shown in operative position in dot-and-dash lines (Figure 7), thus indicating its absence or presence in its retaining socket 114. A driving pawl 116 is pivoted at 117 on the lower portion of the dog and a weighted outer end 118 maintains this pawl in ratcheting and driving engagement with the ratchet wheel 112.

The removable handle 115 extends waist high above the pit box edge and ground level, and by swinging it back and forth on its axis 54 to oscillate the ratcheting dog 113 in a clockwise direction, it follows that the driving pawl 116 grips and advances the ratchet wheel 112, thereby rotating the hose reel 52. The motor driven chain 83 idles during this hand operation since the motor clutch C is held disengaged by the clutch spring 105.

A long-stretch coil tension spring 119 (Figures 7 and 8) is interconnected between the ratcheting dog 113 and the box wall, for one-way operation of the dog, to return it counterclockwise (Figure 7) and maintain it and the handle 115 in upright position. A locking pawl 120 is pivoted at 121 on the bearing bracket 55 rotatably supporting the reel 52. A spring 122 acts on the locking pawl 120 and constantly rides its latching free end against the tooth ratchet wheel 112 to hold it and the reel 52 at each step-by-step rotation imparted by the handle 115 and also to permit the handle and driving pawl 116 to reverse and pick up the ratchet wheel for another advance.

The design and construction of the ratcheting dog 113 lends itself also to foot operation as next described, and it will be seen that simplicity is attained by reason of a minimum number of parts in the combination of the hand and foot driving and controlling means for the hose reel 52.

The operator-actuated ratcheting dog 113 also includes, in addition to its handle socket 114, a laterally extending arm 123, on the outer end of which is pivotally connected the lower end of a vertically disposed thrust link 124. The upper end of this thrust link is pivotally connected with a collar 125 carried on and reciprocated by a plunger pedal 126. Spaced guides 127 anchored within the pit box B serve to slidably support the plunger pedal 126 in a vertical position to swing the arm 123 and oscillate the dog 113.

The collar 125, in this example of the invention, is shown as being attached to the plunger pedal 126 by a set screw 128 (see Figures 10 and 11) fixed in the collar with the inner end of said screw free in a radial groove 129 formed in the pedal. This arrangement permits a limited manually adjustable twisting motion of the pedal 126 within the collar 125, but serves to join together the pedal and thrust link 124 for up and down motion.

The upper end of the plunger pedal 126 is made with or fixed to a foot tread 130 having an integral latching toe 131 adapted to latch under a stationary angle plate in the form of a stop lug 132 anchored to the inside framing or cross beam 7 at the upper edge of the pit box just under the plane or line of the box lid 6b covering the hose reel 52. By a slight axial twist of the plunger pedal 126, imparted by an operator's hand grasping the pedal tread 130, the latching toe 131 is snapped out from under the stop lug 132. Thereupon, the pedal 126 slides upwardly to its limit under the pull of the long-stretch spring 119 acting counterclockwise on the ratcheting dog 113.

The up-position of the plunger pedal 126, above ground level, now enables the operator to actuate it vertically with his foot, thereby imparting a clockwise step-by-step rotary motion to the ratcheting dog 113 through the drive of the pawl 116 riding the toothed ratchet wheel 112 fixed on the hose reel shaft 54. The pedal 126 and handle 115 drive the reel 52 through the same mechanism, a feature which characterizes this apparatus. The long-stretch spring 119 returns the pedal 126 to its up position after each leg stroke of the operator.

Figure 8 illustrates the mode of operation of the ratchet and pawl mechanism when driving the reel for rewinding the long dispensing hose 77 by use of the handle 115 or plunger pedal 123 or both. Incidentally, the brake pedal tread 107 may be used at this time to steady the rotation of the reel 52 by lightly applying foot pressure on the brake pad 108, in the event the hose should lap forward and tend to impart momentum and cause kinking thereof.

Figure 9 is important to next consider as showing the mode of operation of the ratchet and pawl mechanism, its inoperative or throw-out position, when the motor 81 is in use for rewinding the hose. At such time the clutch C is engaged by depressing the tread 106 of the clutch control pedal 97, as previously described. The ratcheting dog 113 must then be rendered inoperative, that is, set to a stationary position and disconnected from the ratchet wheel 112.

In Figures 7 and 9, the arm 123 has been pushed down to its lower limit and latched there by reason of the plunger pedal tread 130 having been adjustably twisted by an operator who reaches down and turns the pedal to the right until the latching toe 131 engages under the stationary stop 132. The operator does this by hand against the resistance of the spring 119 and the sping latches the pedal toe 131 under the retaining lug 132. Thus the plunger pedal 126 is now out of the way, below ground level, either for the purpose of closing the pit box lid 6b, or for using the motor 81 to perform a hose rewinding operation.

The foregoing latching down operation of the plunger pedal under the retaining lug 132 also displaces both ratcheting pawls 116 and 120 (Figure 9) to inoperative position. Thus they no longer ride the ratchet wheel 112 and the latter is now free to rotate with the reel shaft 54 being driven by the motor 81 through the chain 83 and other transmission means. As the arm 123 goes down to its limit, in order that the pedal 130 may latch under the retaining lug 132, it follows that the pivot 117 carrying the weighted pawl 116 is moving clockwise.

Accordingly, it is seen that such movement of the pivot 117 drags the lower edge of the pawl end 118 over the pivot 121 of the locking pawl 120. The camming end 118 rises as it tries to pass the pivot 121 and the other end of the pawl 116 (its ratcheting end) is depressed and knocked out of engagement with the ratchet wheel 112; not only that but it also knocks the locking pawl 120 out of engagement from the ratchet wheel 112. The two pawls simply kick each other away from the ratchet wheel, the rear end of the lower pawl 120 acting against the upper pawl 116 and, conversely, the latter against the former.

The weighted end 118 and spring 122 again restore both pawls to engagement with the ratchet wheel 112 for the hand and foot reel driving operation when the pedal 126 is released from under its retaining lug 132. The parts throughout constituting the combination are made to serve dual functions in the alternate or optional driving means for the hose winding reel.

*The pedal 97 also acts to disengage the clutch C*

An understanding of the construction and mode of operation of the foregoing reel handle 115 and the reel pedal 126, which comprise manual or operator-actuated means for rotating the hose reel 52 counterclockwise (Figures 7 and 10) for the purpose of rewinding the fuel hose 77, makes clear the importance of positively disengaging the clutch C when the clutch-control pedal 97 is tilted back into the pit box B in the position shown in dotted lines (Figure 7). The clutch must of course be positively disengaged in order to disconnect the reel shaft 54 from the motor-driven shaft 82 preliminary to the manual operation of the reel 52, and the pedal 97 acts to do so as will now be explained.

When the operator's foot (shown dotted in Figures 2 and 7) is lifted from the pedal tread 106, the pedal 97 can be tilted back into the pit box B by simply placing his toe under the outer end of the pedal and lifting it upwardly until the mass or weight of the pedal passes over its dead center beyond the rock shaft 98, and then the pedal drops back into the box under gravity and comes to rest on the reel rim 52.

One of the more usual ways to swing the pedal 97 back into the pit box B, without lifting it by hand or using your foot for throwing it back, is for the operator to press his foot downwardly on the pedal tread 106, thereby engaging the clutch C and fully tensioning the clutch-disengaging spring 105, the operator then suddenly slipping his toe off of the tread 106 and downwardly therefrom while the spring 105 is still stretched. The reaction of the tensioned spring 105 throws or flips the outer end of the pedal 97 upwardly and over toward its dead center position, whereupon gravity acts on the pedal causing it to rapidly drop into dotted line position (Figure 7) against the reel 52. In any event, the down swing and momentum of the pedal is utilized to positively disengage or kick open the clutch C, as will now be explained.

The dog clutch C is one of suitable type for use in connection with this apparatus, and sometimes a clutch may stick and not readily release under the pull of the spring 105. For example, the engaging teeth of the driven clutch sleeve 87 and driving sleeve 88 (Figure 10) may at times exert a tendency to hang together or stick due to the presence of grit in the teeth or other conditions. At any rate, it is not desirable to rely entirely upon the pull of the spring 105 to disengage the clutch C. It is for that reason that this invention employs as one of its features the momentum of the clutch and brake pedal 97, when its outer end is falling downwardly toward the reel 52, to give the clutch C a kick and thus knock it open by a jerk applied to the sleeve 87 slidably on the motor shaft 82.

The lost-motion coacting quadrant hubs 109 and 110 (Figures 2, 10, 13, 14 and 15), as heretofore described for engaging the clutch C by pressure of the operator's foot, are also employed to disengage the clutch, doing so by utilizing the momentum of the pedal 97 as striking power to kick the clutch C open. It has been explained how depressing the outer end of the pedal 97 acts to urge the rock shaft 98 counterclockwise (see arrows in Figure 14) by virtue of engagement at 98a of the radial faces of the two quadrant hubs. The bottom lug 109 is integral with the pedal 97 and acts against the upper lug 110 fixed to the rock shaft 98. In this way, the down motion of the pedal tread 106 urges the arm 100 (Figure 7) upwardly and, by acting through the pull link 102 and linkwork rock shaft 103, swings the clutch shifting fork 99 clockwise (Figure 10) to engage the clutch C. This linkwork, by reverse movement, acts to positively jerk or kick the clutch sleeve 87 out of the clutch sleeve 88, an important function in this apparatus.

The reverse or throw-back inwardly-tilting action of the clutch-control pedal 97, to positively kick open the clutch C, is explained by noting Figure 15 and observing that radial coacting faces 98b of the two quadrant hubs 109 and 110 are utilized to initiate the clutch disengaging function, aided of course by the pull of the spring 105. Figure 15 shows the pedal 97 tilted clockwise downwardly and toward the right, the same position as in dotted lines in Figure 7, and in said position it is this second pair of lug radial faces 98b which act reversely to rock the linkwork shaft 103 counterclockwise (Figure 10) to kick or jerk the clutch sleeve 87 out from the clutch sleeve 88.

The coacting lugs and their shouldering planes 98a (Figure 14) lift the arm 100 to engage the clutch C, while the opposite or second pair of shoulders 98b depress this arm to disengage the clutch. When the pedal 97 is tilted outwardly (counter-clockwise arrows, Figure 14) the lost-motion hub shoulders 98a engage to hold the pedal some six inches more or less above the ground. Reversely, when the pedal is tilted inwardly (clockwise arrows, Figure 15) the lost-motion quadrant hub 109 of the pedal strikes the other quadrant hub 110 before the pedal reaches the reel rim 52, and that action forcibly dislodges the clutch C by knocking the driven toothed sleeve 87 out from the driving sleeve 88. Thus dislodged, the clutch teeth are held open by the spring 105.

Accordingly, the clutch-disengaging spring 105 is not relied upon to dislodge the dog clutch C, but it is the falling weight or mass of the pedal 97 which does so. The weight of the pedal simply imparts its striking momentum through the lost-motion linkwork 98b and 102, etc., and gives the clutch a kick, thereby freeing it from any sticking tendency due to grit or other conditions, whereupon the spring 105 readily completes the clutch opening action and holds it open.

When using the clutch-control pedal 97 as a foot-operated reel-brake pedal (dotted line position, Figures 7 and 13), it follows that downward foot motion on the pedal tread 107 pushes in the same direction on the linkwork 102 and 103 as the spring 105 is pulling. This spring acts on the linkwork and clutch C to hold the latter open at all times after it has been forcibly disengaged by the inwardly tilting motion of the multi-purpose pedal. The clutch-disengaging function of the pedal 97 provides a more practical arrangement than that of employing a strong tension spring 105 to alone disengage the clutch C.

The clutch engaging-and-disengaging pedal 97 which also is a foot-operated brake pedal for the reel 52 has a fourth and further function in connection with the lid 6b when the latter is closed down over the reel compartment of the pit box B after the operator has wound in the long fuel hose 77 and placed its dispensing nozzle 78 at top or uppermost position thereon. This further combination of the clutch and brake pedal with the pit box lid is next described.

*The pit box lid when closed brakes the hose reel*

In Figures 17, 18 and 19, the parts and construction heretofore described are given the same reference numbers as before. The lid 6b swings on its hinge means 6 to close down on the ground-flush upper edge of the vertical wall 3 of the pit box B. Hence, new reference numbers are applied only to the new parts relating to this additional feature of the invention employing the weight of the pit box lid as a braking means to hold the reel 52 against rotation when the apparatus is not in use.

It is desirable to brake and hold the rotatable hose reel 52 against motion when the pit box is closed, and for this purpose the lid 6b when closed down over the apparatus acts as a brake on the reel. The movement of traffic across a closed pit box fueler B may set up vibration and cause the reel 52 to partially turn. This is particularly true when it is noted that the winding of the hose 77 on the reel may not result in a perfectly balanced condition of parts since the hose may possess more or less weight on one side of the reel axis 54 than on the other. Likewise, there is the weight of the dispensing nozzle 78 which throws the reel out of balance and tends to rotate it until the nozzle comes to rest on the bottom side. If that occurs, the nozzle may drop down into the box and become difficult for an operator to retrieve.

According to the foregoing, it is desirable to hold the reel 52 against rotation when the apparatus is not in use, and likewise it is not practical to provide any type of locking device operative through the cover lid by which to brake the reel and hold it after the pit box is closed. Therefore, this invention provides means by which the box lid automatically applies a braking effort to the reel for holding it against motion, thereby maintaining the hose nozzle 78 at the top of the reel in convenient reach (Figure 7) of the operators.

In Figure 17, the lid is made with a boss or pad 134 which swings down into engagement with the pedal braking tread 107 of the clutch control pedal 97, the latter having been tilted into the pit box B as shown. The weight, in whole or in part, of the lid 6b bears or rests against the pedal 97 and exerts braking pressure through the brake pad 108 engaging the reel rim 52. At the same time, the lid 6b also closes down against the top edge of the wall 3 of the pit box. The latter is accomplished by accurately locating the hinges 6 and properly fitting the lid to the box in order that the lid boss 134 may engage the pedal end 107 simultaneously with the underneath surface of the lid coming to rest upon the upper edges of the box B.

In Figure 18, the same function is accomplished in another manner and with a construction which may lend itself to rapid assembly and minimum fitting of lid parts. The pit box lid 6b is provided on its under side with a pressure-compensating member in the form of a yieldable bowed leaf spring 135, the outer ends of which are carried in guide loops 136 welded to the inner surface of the lid. The extremities of the leaf spring 135 are formed at an angle to make locking toes 137 which maintain the bowed spring 135 in position. It will be noted, therefore, that when the lid swings down in closed position it readily engages the top edges of the box wall 3 and the yieldable leaf spring 135 simultaneously applies a yielding pressure to the uppermost tread end 107 of the pedal. In this way, the weight of the lid is applied to the brake pad 108 through the yielding spring 135 to hold the reel 52 against turning.

Referring now to Figure 19, there is shown a further construction coming within the principle of this phase of the invention. The pit box lid 6b carries a spring horn 138 welded or otherwise fixed to the inner surface of the lid. This spring member 138 may have two free ends comprising spaced pressure feet 139 which bear directly against the rim of the hose reel 52 when the lid is closed. Thus, the yieldable bow spring 138 applies a braking pressure directly to the reel without engaging the clutch pedal 97. Accordingly, the clutch pedal 97 need not form a part of the lid braking means for the reel when the apparatus is not in use. However, when the lid is up and the apparatus is in use, the pedal performs its normal function of acting as a brake against the rotating reel by applying foot pressure to the tread 107 in connection with reeling the hose out and rewinding the hose, as heretofore described.

This invention is presented to fill a need for a useful fuel handling pit box. It is understood that various modifications in construction, operation, use and method, may and often do occur to those skilled in the art, especially after benefiting from the teachings of an invention, and that this disclosure is exemplary of the principles but not limited to the present embodiment of the invention.

What is claimed is:

1. Apparatus for handling gasoline and the like comprising, in combination, a submerged pit box having its upper edge disposed at ground level, a ground flush lid by which to open and close the pit box, and a reel containing a hose line mounted within the pit box, the hose line being adapted for connection with a storage pipe line through which gasoline flows; a controlling device comprising a pedal cooperating with the reel by which to control the rotation of said reel when winding the hose thereupon, and means mounting the pedal within the pit box for movement out of said box into position for convenient use above ground level and also for movement back into said box below ground level after the hose is wound on the reel in order that the pit box lid may be closed.

2. Apparatus for handling gasoline and the like comprising, in combination, a submerged pit box having its upper edge disposed at ground level, a ground flush lid by which to open and close the pit box, and a reel containing a hose line mounted within the pit box, the hose line being adapted for connection with a storage pipe line through which gasoline flows; means for driving the reel, a controlling device cooperating with the driven reel by which to control its operation in winding the hose thereupon, and means movably mounting the controlling device within the pit box for movement out of said box into position for an operator's convenient use above ground level and also for movement back into said box below ground level after the hose is wound on the reel in order that the pit box lid may be closed.

3. Apparatus for handling gasoline and the like comprising, in combination, a submerged pit box having its upper edge disposed at ground level, a ground flush lid by which to open and close the pit box, and a rotatable reel containing a hose line mounted within the pit box, the hose line being adapted for connection with a storage pipe line through which gasoline flows; controlling means cooperating with the rotatable reel by which to wind the hose thereupon, and means mounting the controlling means within the pit box in operative relation with the reel for movement out of said box into position for convenient use above ground level and for movement back into said box below ground level after the hose is wound on the reel in order that the pit box lid may be closed.

4. Apparatus for handling gasoline and the like comprising, in combination, a submerged pit box having its upper edge disposed at ground level, a ground flush lid by which to open and close the pit box, and a reel containing a hose line mounted within the pit box, the hose line being adapted for connection with a storage pipe line through which gasoline flows; means for driving the reel by which to wind the hose thereupon, pedal means for controlling the rotation of the driven reel, and means movably supporting the pedal means within the pit box for use in two positions by an operator's foot, of which one position is outside the box above its ground edge level and the other is within the box for permitting the lid to be closed after a hose winding operation.

5. Apparatus for handling gasoline and the like comprising, in combination, a submerged pit box having its upper edge disposed at ground level, and a reel containing a hose line mounted within the pit box, the hose line being adapted for connection with a storage pipe line through which gasoline flows; means for rotating the reel by which to wind the hose thereupon; and a pedal pivotally mounted within the pit box, swingable to a position outside the box which automatically disposes it in control relation with the means for rotating the reel, and thereafter swingable back into the box out of said control relation and into braking position with the reel for operation under foot pressure to retard the rotation of said reel.

6. Fuel oil handling means employing a hose on a reel adapted to be manually unwound therefrom, with motor means for driving the reel to rewind the hose, and a control device for starting and stopping the reel rewinding operation by the motor means comprising, in combination therewith, operator-actuated means for driving the reel and rewinding the hose when the motor means is not in use therefor, means operatively mounting the control device in position for performing a dual function, first to apply and remove the power of the motor means for starting and stopping the reel when employing said motor means for rewinding the hose, and second to act as a brake on the reel to retard its rotation when manually unwinding the hose and also when rewinding the hose by the operator-actuated means.

7. Fuel oil handling means employing a hose on a reel adapted to be manually unwound therefrom, with motor means for driving the reel to rewind the hose, and a control device for starting and stopping the reel rewinding operation by the motor means comprising, in combination therewith, operator-actuated means for driving the reel and rewinding the hose when the motor means is not in use therefor, the control device including pedal means, means operatively mounting the pedal means in position for performing a dual function, first to connect and disconnect the power of the motor means for starting and stopping the reel when employing said motor means for rewinding the hose, and second to act as a brake coacting with the reel to retard its rotation when manually unwinding the hose and also when rewinding the hose by the operator-actuated means.

8. Fuel oil handling means employing a hose on a reel adapted to be manually unwound therefrom, with motor means for driving the reel to rewind the hose, and a clutch for connecting and disconnecting the reel and motor means comprising, in combination therewith, operator-actuated means for also driving the reel and rewinding the hose when the motor means is not in use therefor, a pedal for controlling the clutch, pivot means operatively mounting the pedal for adjustment into two positions for performing independent functions, said pedal adapted to be swung on its pivot means into one position for controlling the clutch as aforesaid, and swung into another position to act as a brake on the reel to retard its rotation when manually unwinding the hose and also when rewinding the hose by the operator-actuated means.

9. Fuel oil handling means employing a hose on a reel adapted to be manually unwound therefrom, and motor means for driving the reel to rewind the hose, with a control device and clutch for starting and stopping the reel rewinding operation of the motor means comprising, in combination therewith, operated-actuated means for driving the reel and rewinding the hose when the motor means is not in use therefor, a pivot operatively mounting the control device in two positions for performing dual functions, quadrant hub means on the pivot including a pair of coacting lugs which engage to effect control of the clutch when the control device is in one position on the pivot, and which disengage to free the control device from its clutch control function and adapt it as a brake to coact with the reel when said control device is in another position on the pivot.

10. Fuel oil handling means employing a hose on a reel and motor means for driving the reel to rewind the hose thereon comprising, in combination therewith, operator-actuated means for driving the reel and rewinding the hose when the motor means is not in use therefor, a pedal mounted on a pivot and adapted to be swung thereon into one position away from the reel, and means operated by the pedal in this first position to apply and remove the power of the motor means for starting and stopping the reel when employing the motor means for rewinding the hose, said pedal also being adapted to swing into another position toward and into braking engagement with the reel to retard its rotation when the motor means is not in use.

11. Fuel handling apparatus including a pit box with its walls and upper edge adapted to be submerged to ground level, enclosing a reel containing a hose, and motor means with a clutch for driving the reel comprising, in combination therewith, a rock shaft mounted within the pit box below its upper edge, parallel with the axis of the reel, and between the reel axis and wall of the box; and an angular pedal having a down turned portion operatively mounted on the rock shaft, an upper horizontal portion disposed above the box edge and extending outwardly thereacross, and an operating connection between the rock shaft and clutch.

12. Fuel handling apparatus including a pit box with its walls and upper edge adapted to be submerged to ground level, enclosing a reel containing a hose, and motor means with a clutch for driving the reel comprising, in combination therewith, pivot means operatively mounted within the pit box below its upper edge, in substantially parallel relation with the axis of the reel; a control member having its upper end above the pit box convenient to an operator with its lower end operatively mounted on the pivot means, an operating connection between the control member and clutch to engage said clutch when said control member is moved in one direction on the pivot means, the control member adapted to be swung in the other direction into the pit box below its upper edge out of the way, and means actuated by said last motion of the control member for disengaging and holding the clutch open.

13. Fuel handling apparatus including a pit box with its walls and upper edge adapted to be submerged to ground level, enclosing a reel containing a hose, and motor means with a clutch for driving the reel comprising, in combination therewith, a rock shaft mounted within the pit box below its upper edge, parallel with the axis of the reel, and between the reel axis and one wall of the box; a pedal mounted on the rock shaft with a foot portion swingable into position over the box edge, and an operating connection between the rock shaft and clutch operable to engage said clutch, the pedal being swingable on the rock shaft into the box toward the reel.

14. Fuel handling apparatus including a pit box with its walls and upper edge adapted to be submerged to ground level, enclosing a reel containing a hose, and motor means with a clutch for driving the reel comprising, in combination therewith, a rock shaft mounted within the pit box below its upper edge, parallel with the axis of the reel, and between the reel axis and one wall of the box; an angular pedal having a down turned portion operatively mounted on the rock shaft, an upper horizontal portion disposed above the box edge and extending outwardly thereacross, an operating connection between the rock shaft and clutch and actuated by the pedal when in position extending across the box edge, the pedal being adapted to swing back into the box, and a brake engageable with the reel by the pedal in its last position.

15. Fuel handling apparatus including a pit box with its walls and upper edge adapted to be submerged to ground level, enclosing a reel containing a hose, and motor means with a clutch for driving the reel comprising, in combination therewith, a rock shaft mounted within the pit box below its upper edge, parallel with the axis of the reel, and between the reel axis and one wall of the box; a pedal mounted free on the rock shaft and having a quadrant hub also free to turn on said shaft, a quadrant sleeve fixed on the rock shaft, the quadrant hub and sleeve being engageable by which to control the clutch from the pedal, the quadrant hub and sleeve being disengageable by which to render the pedal inoperative to control the clutch, and a brake applied to the reel by the pedal when it is inoperative to control the clutch.

16. Fuel handling apparatus including a pit box with its walls and upper edge adapted to be submerged to ground level, enclosing a reel containing a hose, and motor means with a clutch for driving the reel comprising, in combination therewith, a rock shaft mounted within the pit box below its upper edge, parallel with the axis of the reel, and between the reel axis and one wall of the box; a pedal of angular form having a down turned portion operatively mounted on the rock shaft, an upper horizontal portion disposed above the box edge and extending outwardly thereacross, and an operating connection between the rock shaft and clutch; two treads provided on the horizontal portion of the pedal, one tread for engagement by an operator's foot when the pedal is disposed above and across the box edge to actuate the rock shaft, the pedal adapted to be tilted on the rock shaft back into the box, and a brake means coacting with the reel and applied by the pedal when in its latter position, the other tread for engagement by the operator's foot when the pedal is in said latter position to actuate the brake.

17. A fuel handling pit box having a pivoted lid thereon flush with the ground level which encloses a reel with a hose thereon comprising, in combination therewith, a ratcheting mechanism operatively connected with the reel to drive same, a pedal operatively connected with the ratcheting mechanism, means mounting the pedal within the pit box adapting said pedal to be elevated above the level of the lid for foot operation and to be restored below said level in order that the lid may close, and means automatically connecting and disconnecting the pedal with and from the mechanism when the pedal assumes, respectively, its two positions.

18. A fuel handling pit box having a pivoted lid thereon flush with the ground level which encloses a reel with a hose thereon comprising, in combination therewith, a pedal within the pit box normally located below the level of the lid permitting the closing of said lid over the pedal, means for elevating the pedal above the level of the lid, and ratchet mechanism acting to automatically disconnect the pedal from the reel when displaced below the lid level as well as connecting it with said reel when elevated above said level.

19. A fuel handling pit box having a pivoted lid thereon flush with the ground level which encloses a reel with a hose thereon comprising, in combination therewith, a ratchet and pawl mechanism within the pit box below the lid line, a handle extending from the ratchet and pawl mechanism upwardly through the pit box above ground level for manually driving the reel, socket means adapting the handle to be detachably connected with said mechanism, and manually operable means for connecting and disconnecting the ratchet and pawl mechanism with the reel, and means including a driving connection between the manually operable means and said mechanism by which said manually operable means is adjusted to foot-operating position also for driving the reel.

20. Fuel handling apparatus including a pit box with its walls and upper edge adapted to be submerged to ground level, enclosing a reel containing a hose, and motor means with a clutch for driving the reel comprising, in combination therewith, a pedal mounted within the pit box, an operating connection between the pedal and reel by which said reel may be driven by an operator's foot, spring actuated means for holding the clutch of the motor means disengaged while the reel is being driven by the pedal, and means for disconnecting the operating connection between the pedal and reel while said reel is being driven by the motor means.

21. Fuel handling apparatus including a pit box with its walls and upper edge adapted to be submerged to ground level, enclosing a reel having a hose line, and motor means with a clutch for driving the reel comprising, in combination therewith, a pedal mounted within the pit box, an operating connection between the pedal and reel by which the reel may be driven by an operator's foot, spring actuated means for holding the clutch of the motor means disengaged while the reel is being driven by the pedal, and means actuated by the pedal for disconnecting the operating connection between the pedal and reel while the reel is being driven by the motor means.

22. Fuel handling apparatus including a pit box with its walls and upper edge adapted to be submerged to ground level, enclosing a reel having a hose line, and motor means with a clutch for driving the reel comprising, in combination therewith, a pedal mounted within the pit box, an operating connection between the pedal and reel, mounting means supporting the pedal and so arranged that it stands above the pit box edge for operation by foot power, spring actuated means for holding the clutch of the motor means disengaged while the reel is being driven by the pedal, means cooperating with the pedal adapting it for displacement downwardly below the lid box edge when not in use, and means for disconnecting the operating connection when the pedal is displaced downwardly while the reel is being driven by the motor means.

23. Fuel handling apparatus including a pit box with its walls and upper edge adapted to be submerged to ground level, enclosing a reel having a hose line, and motor means with a clutch for driving the reel comprising, in combination therewith, a plunger pedal mounted within the pit box above the box edge, an operating connection between the plunger pedal and reel by which a reciprocating motion of said pedal drives the reel, spring actuated means for holding the clutch of the motor means disengaged while the reel is being driven by the pedal, the pedal being mounted and arranged to undergo a downward adjustable twisting displacement below the box edge, means to hold the pedal in this latter position, and means actuated by the pedal in said latter position for disconnecting the operating connection between the pedal and reel while said reel is being driven by the motor means.

24. Fuel handling apparatus including a pit box with its walls and upper edge adapted to be submerged to ground level, enclosing a reel carrying a hose line, and motor means with a clutch when engaged for driving the reel comprising, in combination therewith, a pedal mounted upright within the pit box, an operating connection including a ratchet and pawl between the pedal and reel by which the latter may be driven by an operator's foot which forces the pedal on its down stroke, means tensioning the operating connection to return the pedal on its up stroke, means for disconnecting the ratchet and pawl to render the pedal inoperative, the plunger pedal being disposed above the pit box ground level for reciprocation and adapted to be displaced downwardly below said level to actuate the means for disconnecting the ratchet and pawl, and means associated with the pit box and pedal for maintaining said pedal in its downwardly displaced position.

25. Fuel handling apparatus including a pit box with its walls and upper edge adapted to be submerged to ground level, enclosing a reel carrying a hose line, and motor means with a clutch for driving the reel comprising, in combination therewith, a plunger pedal mounted to reciprocate within the pit box above ground level, a ratchet wheel and dog mounted on the reel, an arm extending from the dog, a thrust link connecting the arm with the plunger pedal, a driving pawl pivoted on the dog and engaging the ratchet wheel to turn same, and a locking pawl latching against the ratchet wheel to prevent reverse turn thereof, the two pawls being operatively mounted adjacent each other and arranged for coaction by a downward thrust of the pedal below the box ground level to knock both pawls away from the ratchet wheel for disconnecting the dog from the reel.

26. Fuel handling apparatus including a pit box with its walls and upper edge adapted to be submerged to ground level, enclosing a reel and hose line, and motor means with a clutch for driving the reel comprising, in combination therewith, a clutch control pedal to engage said clutch for driving the reel by motor power, a reel driving pedal mounted within the pit box and having an operating connection with the reel for driving same by foot power, spring actuated means for holding the clutch of the motor means disengaged while the reel is being driven by the pedal, and means for disconnecting the operating connection between the pedal and reel while said reel is being driven by the motor means.

27. Fuel handling apparatus including a pit box with its walls and upper edge adapted to be submerged to ground level, enclosing a reel and hose line, and motor means with a clutch for driving the reel comprising, in combination therewith, a clutch control pedal to engage said clutch for driving the reel by motor power, a reel driving pedal mounted within the pit box and having an operating connection with the reel for driving same by foot power, spring actuated means for holding the clutch of the motor means disengaged while the reel is being driven by the pedal, means for disconnecting the operating connection between the pedal and reel while said reel is being driven by the motor means, pivot means mounting the clutch control pedal above and across the edge of the pit box, the clutch control pedal adapted to be swung on the pivot into and below said box edge, and a brake means acting against the reel and operated by the clutch control pedal inside the box when the reel is being driven by the reel driving pedal.

28. Fuel oil handling apparatus including a pit box with its walls and upper edges adapted to be submerged to ground level, enclosing a reel containing a hose, and motor means with a clutch and driving transmission for operating the reel comprising, in combination therewith, a pedal mounted within the pit box having two independently operative positions in relation to said box, one within the box and the other outside thereof, and an operating connection between the clutch and pedal acting to engage the clutch when the pedal is depressed outside the box and to disengage the clutch when depressed inside the box.

29. Fuel oil handling apparatus including a pit box with its walls and upper edges adapted to be submerged to ground level, enclosing a reel containing a hose, and motor means with a clutch and driving transmission for operating the reel comprising, in combination therewith, a pedal mounted within the pit box having two independently operative positions in relation to said box, one within the box and the other outside thereof, an operating connection between the clutch and pedal acting to engage the clutch when the pedal is depressed outside the box and to disengage the clutch when depressed inside the box, and a lost-motion means included in the operating connection rendering the latter inoperative for either action except when the clutch is either within the box or outside thereof.

30. Fuel oil handling apparatus including a pit box with its walls and upper edges adapted to be submerged to ground level, enclosing a reel containing a hose, and motor means with a clutch and driving transmission for operating the reel comprising, in combination therewith, a pedal pivoted within the pit box adapted to swing outside and back into said box, with an operating connection between the clutch and pedal acting to engage the clutch when the pedal is depressed outside the box and to disengage the clutch when the pedal is pivoted into the box, and a spring cooperating with the pedal to tilt it over into the box when the operator depresses the pedal which tensions the spring and he slips his foot off said pedal.

31. Fuel oil handling apparatus including a pit box with its walls and upper edges adapted to be submerged to ground level, enclosing a reel containing a hose, and motor means with a clutch and driving transmission for operating the reel comprising, in combination therewith, a pedal mounted within the pit box, a rock shaft on which the pedal is pivoted, a pair of hubs carried on the rock shaft, with one hub fixed to said shaft and the other hub integrally formed with the pedal, the hubs having lost-motion engageable shoulders, and an operating connection between the rock-shaft and the clutch acting to engage said clutch when the pedal is depressed outside the box and to positively disengage the clutch when said pedal is pivotally displaced into said box.

32. Fuel oil handling apparatus including a pit box with its walls and upper edges adapted to be submerged to ground level, enclosing a reel containing a hose, and motor means with a toothed clutch and driving transmission for operating the reel comprising, in combination therewith, a pedal pivoted within the pit box having two independently operative positons in relation to said box, one within the box and the other outside thereof, each of which positions is attained by swinging the pedal in or out of the box, an operating connection between the toothed clutch and the pedal acting to engage the clutch when said pedal is depressed outside the box, and a lost-motion device included in the operating connection having a striking means actuated by the momentum of the pedal when swinging into the box for exerting a jerking action to dislodge the teeth of the clutch.

33. Fuel oil handling apparatus including a pit box with its walls and upper edges adapted to be submerged to ground level, enclosing a reel containing a hose, and motor means with a toothed clutch and driving transmission for operating the reel comprising, in combination therewith, a pedal within the pit box having two independently operative positions in relation to said box, one within the box and the other outside thereof, means mounting the pedal movably within the box, whereby said pedal may be moved to either operative position, an operating connection between the clutch and pedal acting to engage the clutch when the pedal is depressed outside the box, and spring means acting on the clutch tending to disengage and hold said clutch open, and a striking means actuated by movement of the pedal into the box for forcibly separating the teeth of the clutch.

34. Fuel oil handling apparatus comprising, in combination, a box, a reel with a hose line rotatably mounted in the box, a lid on the box to close same, and means operated by the closed lid to hold the reel against rotation.

35. Fuel oil handling apparatus including a pit box with its walls and upper edges adapted to be submerged to ground level, enclosing a reel containing a hose comprising, in combination therewith, a lid mounted on the box to swing closed thereon into ground-flush position, including means acted on by the lid to engage the reel and hold it against rotation.

36. Fuel oil handling apparatus including a pit box with its walls and upper edges adapted to be submerged to ground level, enclosing a reel containing a hose, in combination with a lid pivoted on the box to swing closed thereon into ground-flush position, and yieldable pressure means engageable with the reel under the influence of the weight of the lid when closed to hold said reel against rotation.

37. Fuel oil handling apparatus including a pit box with its walls and upper edges adapted to be submerged to ground level, enclosing a reel containing a hose, in combination with a braking device under the control of an operator to retard and control the rotation of the reel, and a lid mounted on the box to close thereon into ground-flush position and into engagement with the braking device.

38. Fuel oil handling apparatus comprising, in combination, a box, a reel with hose line rotatably carried in the box, a braking pedal pivotally mounted in the box engaging the reel, a lid to close the box, and means operated by the weight of the closed lid to hold the braking pedal against the reel.

39. Fuel oil handling apparatus including a pit box with its walls and upper edges adapted to be submerged to ground level, enclosing a reel containing a hose, a lid pivoted on the box to swing closed thereon into ground-flush position, in combination with means carried by the lid when closed to directly engage the reel and hold it against rotation.

40. Fuel oil handling apparatus including a pit box with its walls and upper edges adapted to be submerged to ground level, enclosing a reel containing a hose, a lid pivoted on the box to swing closed thereon into ground-flush position, in combination with yieldable pressure means carried on the under side of the lid adapted to engage the reel under the influence of the weight of the lid and hold said reel against turning when the lid is closed.

WILLIAM J. PETER.